US007991407B2

(12) United States Patent
McCormick et al.

(10) Patent No.: US 7,991,407 B2
(45) Date of Patent: Aug. 2, 2011

(54) METHOD FOR IDENTIFYING APPROPRIATE PUBLIC SAFETY ANSWERING POINTS

(75) Inventors: Catherine L. McCormick, W. Bloomfield, MI (US); Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 615 days.

(21) Appl. No.: 11/355,716

(22) Filed: Feb. 16, 2006

(65) Prior Publication Data
US 2007/0191027 A1    Aug. 16, 2007

(51) Int. Cl.
*H04Q 7/20* (2006.01)
(52) U.S. Cl. ............ 455/456.3; 455/456.1; 455/456.2; 455/404.1; 455/550.1; 455/404.02
(58) Field of Classification Search .... 455/404.1–404.2, 455/456.1–456.3, 414.1–414.3, 426.1, 11.1, 455/40, 41.2, 404.02
See application file for complete search history.

(56) References Cited

U.S. PATENT DOCUMENTS

| 5,736,962 | A * | 4/1998 | Tendler ............... 342/357.1 |
| 6,249,252 | B1 * | 6/2001 | Dupray ............... 342/450 |
| 6,525,689 | B2 | 2/2003 | Dooley et al. |
| 6,721,395 | B2 * | 4/2004 | Martinez .............. 379/45 |
| 6,757,545 | B2 * | 6/2004 | Nowak et al. .......... 455/456.2 |
| 6,853,910 | B1 | 2/2005 | Oesterling et al. |
| 6,956,930 | B1 * | 10/2005 | Cook .................. 379/45 |
| 6,970,783 | B2 | 11/2005 | Knockeart et al. |
| 6,996,391 | B2 * | 2/2006 | Hunzinger ............. 455/404.1 |
| 2002/0103622 | A1 * | 8/2002 | Burge ................ 702/183 |
| 2005/0240378 | A1 | 10/2005 | Smith et al. |
| 2006/0064232 | A1 | 3/2006 | Ampunan et al. |
| 2006/0106584 | A1 | 5/2006 | Oesterling et al. |
| 2007/0287473 | A1 * | 12/2007 | Dupray ............... 455/456.1 |

* cited by examiner

*Primary Examiner* — Charles N Appiah
*Assistant Examiner* — Emem Stephen
(74) *Attorney, Agent, or Firm* — Dierker & Associates, P.C.

(57) ABSTRACT

A method for identifying an appropriate public safety answering point for a mobile unit includes establishing communication between a telematics service provider and the mobile unit. Mobile unit data is received at the telematics service provider. The data includes at least the speed of the mobile unit. The telematics service provider, upon recognition and analysis of the data, predicts a position of the mobile unit during a planned conversation with a public safety answering point. An appropriate public safety answering point is identified based on the predicted position of the mobile unit. Communication with the identified public safety answering point is established from the telematics service provider.

2 Claims, 2 Drawing Sheets

METHOD FOR IDENTIFYING APPROPRIATE PUBLIC SAFETY ANSWERING POINTS

TECHNICAL FIELD

The present disclosure relates generally to methods for identifying appropriate public safety answering points.

BACKGROUND

Some vehicle communication systems allow drivers to contact a particular service provider in the event of an emergency. The service provider may be able to determine the location of the driver, and then contact a public safety answering point (PSAP) that is located within the boundary that the vehicle is located in. To assist the service provider, a database of public safety answering geographic boundaries and the phone numbers may be accessed.

One potential problem with such a system is that a service provider may have difficulty determining which PSAP to contact if the vehicle is moving from one appropriate PSAP to another appropriate PSAP. Generally, an appropriate PSAP is a PSAP having jurisdiction to respond to an emergency event.

As such, it would be desirable to provide an improved system for identifying appropriate public safety answering points for an en route vehicle.

SUMMARY

A method for identifying an appropriate public safety answering point for a mobile unit is disclosed. The method includes establishing communication between a telematics service provider and the mobile unit. Mobile unit data is received at the telematics service provider. The data includes at least the speed of the mobile unit. The telematics service provider, upon recognition and analysis of the data, predicts a position of the mobile unit during a planned conversation with a public safety answering point. An appropriate public safety answering point is identified based on the predicted position of the mobile unit. Communication with the identified public safety answering point is established from the telematics service provider.

BRIEF DESCRIPTION OF THE DRAWINGS

Objects, features and advantages of exemplary embodiments of the present disclosure may become apparent by reference to the following detailed description and drawings, in which.

DETAILED DESCRIPTION OF THE EXEMPLARY EMBODIMENTS

Exemplary embodiment(s) of the system and method disclosed herein advantageously allow a prediction to be made of the position of a mobile unit during a planned conversation with a PSAP. Based on this prediction, the appropriate PSAP may be identified and contacted. The prediction may be used, for example, by a service provider to more accurately determine which PSAP to contact, particularly when an emergency call is made from a mobile unit. It is to be understood that the mobile unit may be any suitable mobile unit, including, but not limited to a moving vehicle. The vehicle's speed is taken into consideration when making the prediction. Generally, other factors, such as vehicle heading and/or then-current location may also be taken into consideration when determining the prediction. It is believed that this advantageously allows a substantially accurate prediction to be made.

In an exemplary embodiment, a system making the prediction has the computational ability to make logical decisions regarding the appropriate PSAP to contact, given the various conditions (e.g., vehicle speed, heading, position, etc.).

It is to be understood that, as defined herein, a user may include mobile unit/vehicle operators and/or occupants (if a vehicle).

Figure 1:
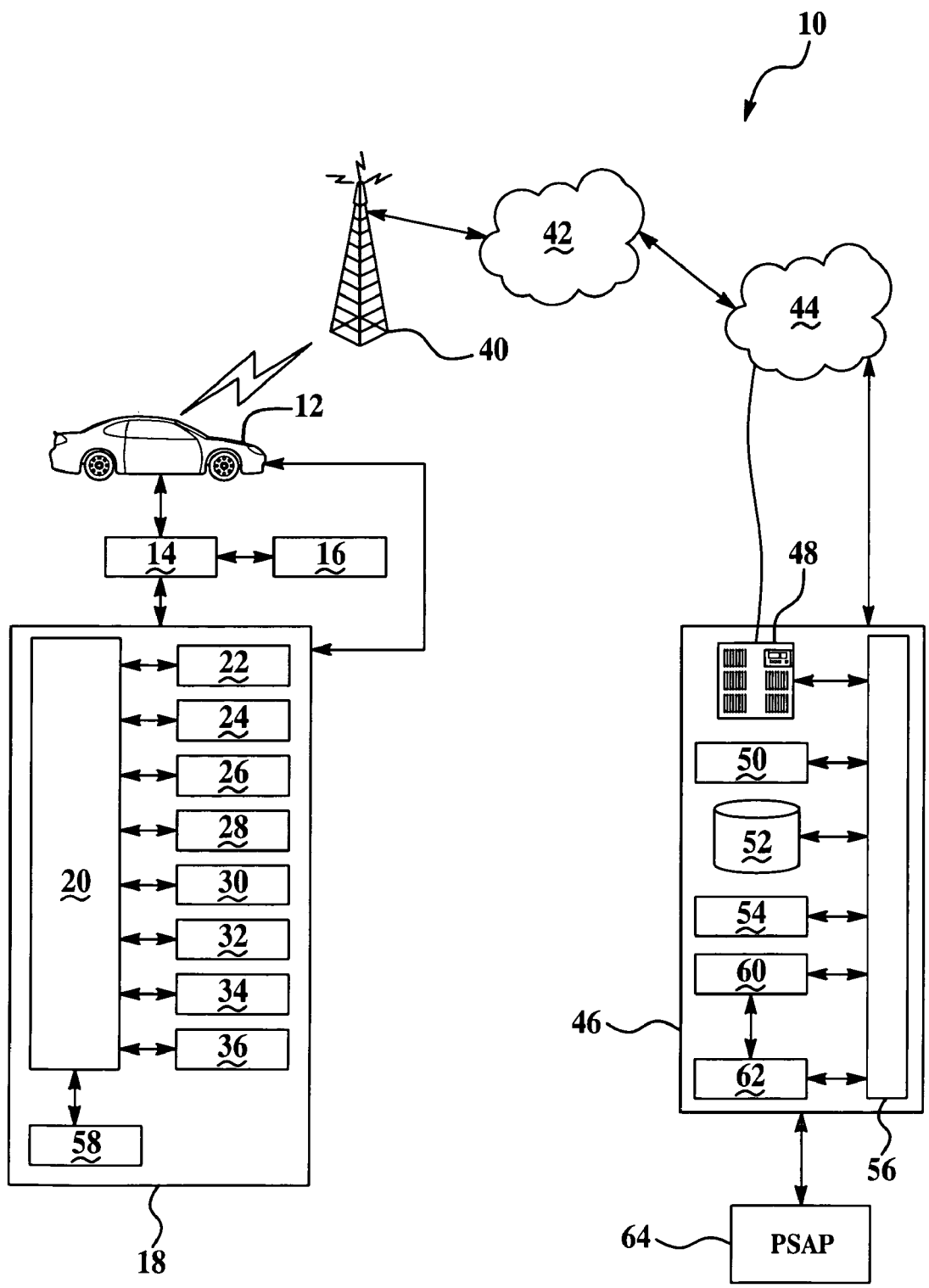
FIG. 1 is schematic diagram depicting an exemplary embodiment of a system for identifying appropriate public safety answering points.

Referring now to FIG. 1, the system 10 includes a mobile unit or vehicle 12, a vehicle communications network 14, a telematics unit 18, a two-way radio frequency communication system (including, but not limited to, one or more wireless carrier systems 40, one or more communication networks 42, and/or one or more land networks 44), and one or more call centers/service providers 46. In one exemplary embodiment, vehicle 12 is a mobile vehicle with suitable hardware and software for transmitting and receiving voice and data communications. System 10 may include additional components suitable for use in telematics unit 18.

In an exemplary embodiment, via vehicle communications network 14, the vehicle 12 may send signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an exemplary embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limitative example of which includes a Wide Area Network (WAN) transceiver), and/or combinations thereof.

Telematics unit 18 may include a processor 20 operatively coupled to a wireless modem 22, a location detection system 24 (a non-limitative example of which is a global positioning system (GPS)), an in-vehicle memory 26, a microphone 28, one or more speakers 30, an embedded or in-vehicle mobile phone 32, and/or a short-range wireless communication network 36 (e.g. a Bluetooth® unit).

It is to be understood that the telematics unit 18 may be implemented without one or more of the above listed components, such as, for example, speakers 30. Yet further, it is to be understood that the speaker 30 may be a component of the vehicle audio system, which may accept audio and/or other signals from the telematics unit 18. Telematics unit 18 may include additional components and functionality as desired for a particular end use.

Processor 20 may be a micro controller, a controller, a microprocessor, a host processor, and/or a vehicle communications processor. In another exemplary embodiment, processor 20 may be an application specific integrated circuit (ASIC). Alternatively, processor 20 may be a processor working in conjunction with a central processing unit (CPU) performing the function of a general-purpose processor.

Non-limitative examples of the location detection system 24 include a Global Position Satellite receiver, a radio triangulation system, a dead reckoning position system, and/or combinations thereof. In particular, a GPS provides latitude and longitude coordinates of the vehicle 12 responsive to a GPS broadcast signal received from a GPS satellite constellation (not shown).

The telematics unit may also include an in-vehicle mobile phone 32, which may be a cellular type phone, such as, for example an analog, digital, dual-mode, dual-band, multi-mode and/or multi-band cellular phone.

Associated with processor 20 may be a real time clock (RTC) 34 providing accurate date and time information to the telematics unit hardware and software components that may require date and time information. In one exemplary embodiment, date and time information may be requested from the RTC 34 by other telematics unit components. In other exemplary embodiments, the RTC 34 may provide date and time information periodically, such as, for example, every ten milliseconds.

Processor 20 may execute various computer programs that interact with operational modes of electronic and mechanical systems within the vehicle 12. It is to be understood that processor 20 controls communication (e.g. call signals) between telematics unit 18, wireless carrier system 40, and call center 46. The processor 20 may have, but is not limited to having, monitoring, computational, decision-making, and communication capabilities.

Further, processor 20 may generate and accept digital signals transmitted between the telematics unit 18 and the vehicle communication network 14, which is connected to various electronic modules in the vehicle 12. In one exemplary embodiment, these digital signals activate the programming mode and operation modes within the electronic modules, as well as provide for data transfer between the electronic modules. In another exemplary embodiment, certain signals from processor 20 may be translated into vibrations and/or visual alarms.

It is to be understood that software 58 may be associated with processor 20 for monitoring and/or recording the incoming caller utterances.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46 (also referred to herein as a telematics service provider). In one exemplary embodiment, land network 44 is a public switched telephone network (PSTN). In another exemplary embodiment, land network 44 is an Internet Protocol (IP) network. In still other exemplary embodiments, land network 44 is a wired network, an optical network, a fiber network, another wireless network, and/or any combinations thereof. The land network 44 may be connected to one or more landline telephones and/or mobile phones. It is to be understood that the communications network 42 and the land network 44 connect the wireless carrier system 40 to the call center 46.

Call center/service provider 46 may contain one or more data switches 48, one or more communication services managers 50, one or more communication services databases 52 containing subscriber profile records and/or subscriber information, one or more services advisors 54, one or more network systems 56, one or more public safety answering databases 60, and/or one or more information recognition and analysis systems 62.

Switch 48 of call center 46 connects to land network 44. Switch 48 transmits voice or data transmissions from call center 46, and receives voice or data transmissions from telematics unit 18 in vehicle 12 through wireless carrier system 40, communications network 42, and land network 44. Switch 48 receives data transmissions from, or sends data transmissions to one or more of the communication service manager(s) 50, the communication services database(s) 52, the services advisor(s) 54, the public safety answering phone database(s) 60, and/or the information recognition and analysis system(s) 62 via the network system(s) 56.

Call center 46 may contain one or more service advisors 54. In one exemplary embodiment, service advisor 54 may be human. In another exemplary embodiment, service advisor 54 may be an automaton.

Still further, the call center 46 is capable of communicating with various PSAP 64 locations. It is to be understood that once the call center 64 contacts the appropriate PSAP 64, the call center 46 may inform the PSAP 64 of the situation, and/or the call center 46 may connect the vehicle user with the PSAP 64.

Figure 2:
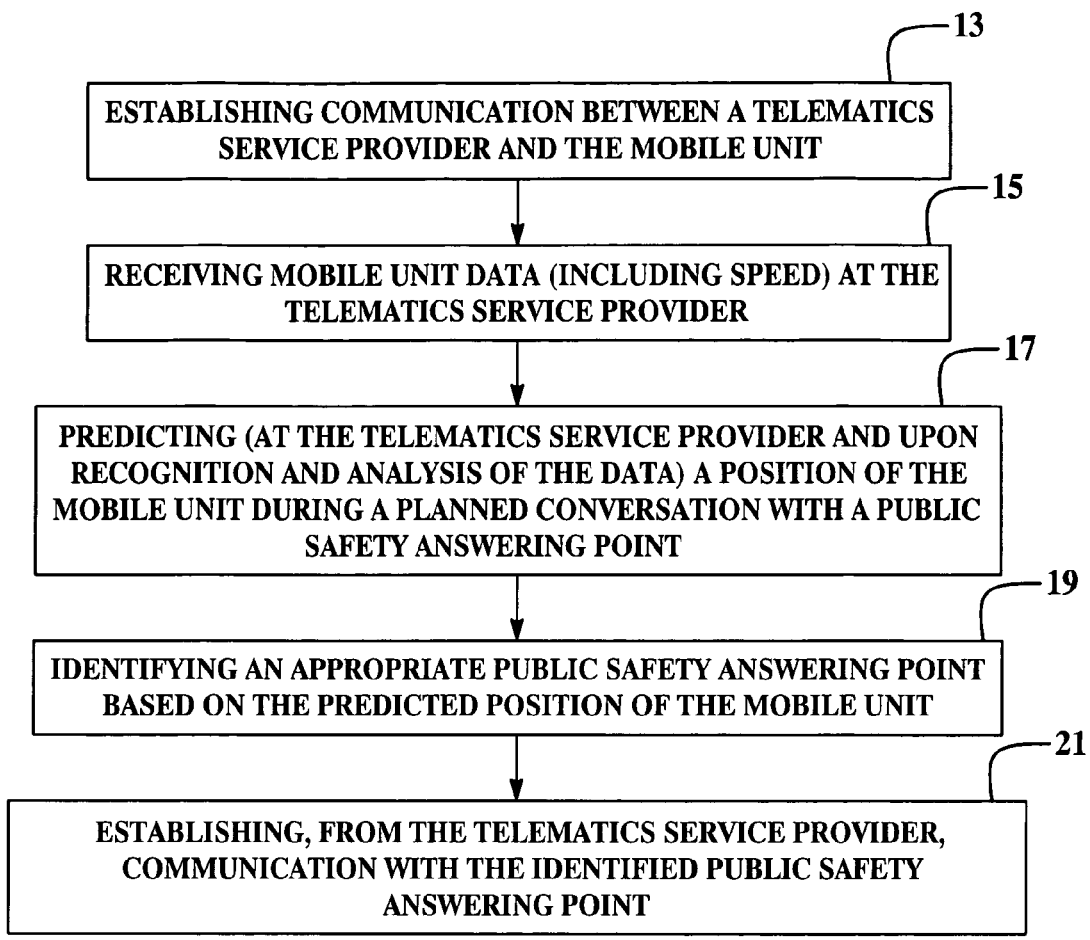
FIG. 2 is a flow diagram depicting an exemplary embodiment of a method for identifying appropriate public safety answering points.

Referring now to FIG. 2, an exemplary embodiment of the method is depicted. Generally, the method includes establishing communication between a telematics service provider 46 and the mobile unit 12, as shown at reference numeral 13; receiving mobile unit data (including speed) at the telematics service provider 46, as shown at reference numeral 15; predicting (at the telematics service provider 46 and upon recognition and analysis of the data) a position of the mobile unit 12 during a planned conversation with a public safety answering point, as shown at reference numeral 17; identifying an appropriate public safety answering point based on the predicted position of the mobile unit 12, as shown at reference numeral 19; and establishing, from the telematics service provider 46, communication with the identified public safety answering point, as shown at reference numeral 21. In one example, a planned conversation includes a service advisor 54 of the telematics service provider 46 facilitating communications between the mobile unit 12 and an appropriate PSAP 64.

Communication between the mobile unit/vehicle 12 and the service provider/call center 46 may be initiated from either the user of the vehicle 12 or by a service advisor 54 of the call center 46. In an exemplary embodiment, the user initiates communication because he/she is, or is going to be, involved in an emergency situation, and/or they desire that a PSAP 64 be contacted.

The user may initiate communication verbally and/or via a physical motion. As such, an input system (used to initiate such communication) may include an alphanumeric keypad, a microphone 28, a menu selection system, and/or combinations thereof.

Verbal communication may take place via microphone 28 coupled to the in-vehicle or mobile phone 32 associated with the telematics unit 18. Caller utterances into the microphone 28 are received at the call center 46, which tokenizes the utterance stream for further processing. In one exemplary embodiment, the tokenized utterances are placed in a subscriber information database 52 at the call center 46.

Physically initiating communication may be accomplished via a button press, touch screen, or the like located in the vehicle 12. It is to be understood that the button press or touch screen is operatively connected to the telematics unit 18. Upon the user's initiation of the button press or touch screen, the telematics unit 18 signals the call center 46 of the fact that the user has initiated communication. In an exemplary embodiment, initiating communication via the button press, touch screen, or the like may also indicate to the call center 46 that an emergency condition exists, prior to communication being established with the user.

The method further includes receiving data relating to the mobile unit 12 at the service provider 46. The data includes at least the speed of the mobile unit 12. Other non-limiting examples of data that is transmitted to the service provider 46 include mobile unit 12 heading (e.g., direction of travel), then-current mobile unit 12 position (which may be determined via the location detection system 24), and/or the like, and/or combinations thereof. It is to be understood that the information/data may be transmitted to the call center 46 as soon as communication has been initiated, and that such transmission may continue when communication is established.

The information/data is transmitted to the vehicle communications network 14, which in turn communicates such information to the telematics unit 18. The telematics unit 18 communicates the information to the service provider/call center 46 via the other components in the system 10. Once received by the call center 46, the switch 48 sends the data transmissions to the information recognition and analysis system(s) 62 via the network system(s) 56, where the data is recognized and analyzed.

In one example, the information recognition and analysis system 62 parses the incoming data into separate fields, such as vehicle identification number (VIN), current latitude, current longitude, speed, and heading. The latitude and longitude values are compared to a digital map database containing the geographic PSAP boundaries that may be operatively disposed in the subscriber information database 52. A distance to the nearest PSAP boundary is determined, taking into account at least vehicle speed and heading. The information recognition and analysis system 62 returns a set of success factors corresponding to the current appropriate PSAP 64 that the mobile unit 12 is in, and the appropriate PSAP 64 where the mobile unit 12 will require service.

In another example, traffic conditions, monitored via in-vehicle traffic probes or traffic information data feeds to the call center 64, may influence the success factor calculation.

After recognition and analysis of the data, the service provider 46 is capable of predicting a position of the mobile unit/vehicle 12 during a planned conversation with the PSAP 64. Generally, the service provider has an indication of how soon after communication is established with the mobile unit 12 that the PSAP 64 will be contacted. This time frame, taken into account with the analysis of the speed and/or direction of travel, allows the service provider 46 to predict the position of the mobile unit 12 at the time the call to the PSAP is to be initiated.

The prediction allows the service provider 46 to identify in which PSAP boundary the mobile unit 12 will likely be located when the conversation with the PSAP 64 is initiated. As such, the predicted position allows the service provider 46 to make a determination of which PSAP 64 is more appropriate to contact. The information recognition analysis system 62 may validate the predicted mobile unit 12 position with the public safety answering phone database(s) 60 to determine which PSAP 64 to contact.

The information recognition analysis system 62 is capable of predicting more than one mobile unit 12 position and/or identifying more than one appropriate public safety answering point 64. In such an instance, the system 62 may assign a probability/success factor to alternate positions and/or PSAP 64 locations. The system 62 may assess and assign the probability that one position and/or PSAP 64 is more appropriate than the other.

In one example, if the data (e.g., speed, direction of travel) indicates that the vehicle 12 is in jurisdiction X and is heading toward jurisdiction Y at a certain speed, two positions may be predicted, and two PSAP 64 locations may be identified as appropriate options. In this non-limitative example, the system 62 may recognize that the vehicle 12 may be located in jurisdiction X if the conversation with a PSAP 64 is initiated within a predetermined time (e.g., 30 seconds), but will be in jurisdiction Y if the conversation with a PSAP 64 is initiated after the predetermined time. As such, at one position and time, one PSAP may be more appropriate than another PSAP.

For example, the system 62 may assign a 99% success factor for the PSAP in jurisdiction X if that PSAP is contacted within the predetermined amount of time, and a 1% success factor if that PSAP is contacted after the predetermined amount of time passes. In this same non-limitative example, the system 62 may assign a 1% success factor for the PSAP in jurisdiction Y if that PSAP is contacted within the predetermined amount of time, and a 99% success factor if that PSAP is contacted after the predetermined amount of time passes.

After predicting the position of the mobile unit 12 and determining or identifying the more appropriate PSAP 64 to contact, the call center 46 establishes communication with the PSAP 64 on behalf of the vehicle/mobile unit user. It is to be understood that the call center 46 may relay the location of the vehicle 12 and the details of the emergency to the PSAP 64, or the call center 46 may connect the mobile unit/vehicle user with the PSAP 64.

It is to be understood that the data may be substantially continuously monitored. As such, if data changes prior to contacting the appropriate PSAP 64, the information recognition analysis system 62 may recognize and analyze the new information, so that the prediction is based on the then-current information.

Figure 3:
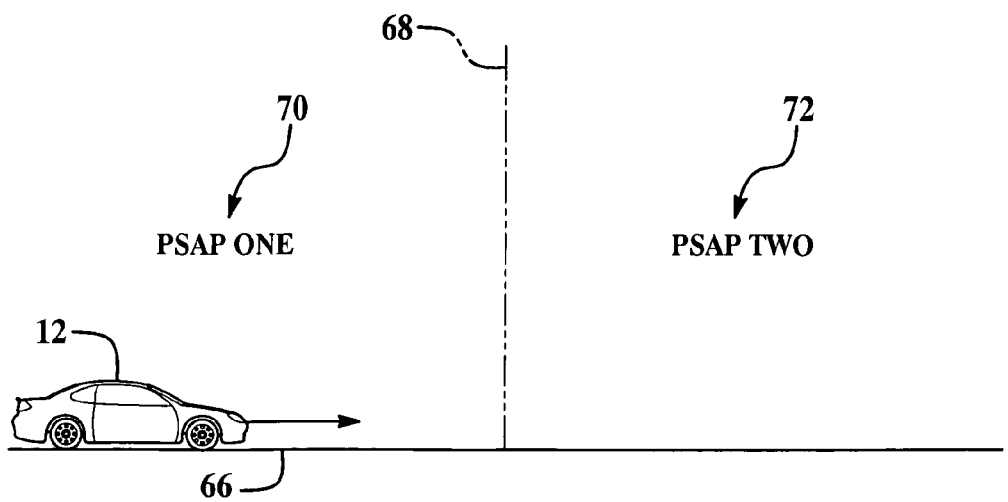
FIG. 3 is a schematic diagram depicting a vehicle traversing one appropriate PSAP boundary to another appropriate PSAP.

Referring now to FIG. 3, a schematic diagram of a vehicle 12 traversing one appropriate PSAP 64 to another appropriate PSAP 64 is provided. In this example, a user in vehicle 12 traversing road segment 66 initiates communication with call center 46 via a button press, touch screen, and/or the like, as previously described. Generally, a period of time elapses between the communication initiation, and establishing communication with the call center 46. The elapsed time may range from, for example, about ten seconds to about thirty seconds. In another example, the elapsed time is collected over a set of samples for a given PSAP 64 and an average communication establishment time is calculated.

The call center 46 service advisor 54 receives data, including vehicle speed, vehicle position, and vehicle heading. For example, when communication between the call center 46 and the vehicle 12 is initiated, data including the vehicle identification number (VIN), the initiation time of the call, and an indication that an emergency condition exists (e.g., via a button press and/or the like, as previously described) may be included as data associated with the call. Upon establishing communication with the call center 46, the service advisor 54 may verify that an emergency condition does indeed exist and may query the vehicle 12 for its current position and/or other desired data.

Responsive to the receipt of the data at call center 46, the call center 46 predicts the position of the vehicle 12 during a planned conversation with the appropriate PSAP 64. In this example, vehicle 12 is traveling at fifty miles per hour or 4,400 feet per minute, and the distance to a PSAP boundary 68 is 4,000 feet, causing the vehicle 12 to cross the PSAP boundary 68 in approximately fifty-five seconds. Vehicle 12 speed is provided from the telematics unit 18 to the call center 46. If, in this example, establishing communications with call center 46 consumes thirty seconds, then vehicle 12 will arrive at the PSAP boundary 68 in approximately twenty-five seconds, resulting in the vehicle 12 leaving PSAP ONE 70 and entering PSAP TWO 72. The call center 46, predicting that vehicle 12 will enter PSAP TWO 72 in approximately twenty-five seconds at fifty miles per hour from the establishment of communications, will predict that PSAP TWO 40 is the appropriate PSAP and will inform the service advisor 54 to contact PSAP TWO 40.

While several embodiments have been described in detail, it will be apparent to those skilled in the art that the disclosed embodiments may be modified. Therefore, the foregoing description is to be considered exemplary rather than limiting.

The invention claimed is:

1. A method for identifying an appropriate public safety answering point for a traveling mobile unit, the method comprising:
    establishing communication between a telematics service provider and the traveling mobile unit;
    receiving data from the traveling mobile unit at the telematics service provider, the data including at least then-current speed, then-current direction of travel and then-current position of the traveling mobile unit;
    predicting, for the traveling mobile unit, at the telematics service provider upon recognition and analysis of the data, at least two positions of the traveling mobile unit during a future planned communication between the traveling mobile unit and a public safety answering point or at a future time when the traveling mobile unit is likely to contact a public safety answering point;
    assigning, via the telematics service provider, a success factor to each of the at least two predicted positions;
    identifying, via the telematics service provider and for the traveling mobile unit, at least two appropriate public safety answering points based on each of the at least two predicted positions of the traveling mobile unit;
    assigning, by the telematics service provider, a success factor to each of the at least two identified appropriate public safety answering points; and
    establishing, from the telematics service provider, communication between the traveling mobile unit and one of the at least two identified appropriate public safety answering points, the appropriate public safety answering point being chosen based on the success factors assigned to each of the at least two identified appropriate public safety answering points;
    wherein one of the at least two predicted positions of the traveling mobile unit is in a first public safety answering point boundary, wherein an other of the at least two predicted positions of the traveling mobile unit is in a second public safety answering point boundary, and wherein assigning the success factor to each of the at least two identified appropriate public safety answering points includes:
    approximating a time it will take the traveling mobile unit to leave the first public safety answering point boundary and enter the second public safety answering point boundary;
    approximating a time it will take for establishing the communication between the traveling mobile unit and the one of the at least two identified appropriate public safety answering points; and
    from the approximations, determining which of the public safety answering point boundaries the traveling mobile unit will be in during the establishing of the communication.

2. A system for identifying an appropriate public safety answering point for a traveling mobile unit, the system comprising:
    means for establish communication between a telematics service provider and the traveling mobile unit;
    means for receiving data from the traveling mobile unit at the telematics service provider, the data including at least then-current speed, then-current direction of travel and then-current current position of the traveling mobile unit;
    means for predicting, for the traveling mobile unit, at the telematics service provider and upon recognition and analysis of the data, at least two positions of the traveling mobile unit during a future planned communication between the traveling mobile unit and a public safety answering point or at a future time when the traveling mobile unit is likely to contact a public safety answering point;
    means for assigning, via the telematics service provider, a success factor to each of the at least two predicted positions;
    means for identifying, via the telematics service provider and for the traveling mobile unit, at least two appropriate public safety answering points based on the at least two predicted positions of the traveling mobile unit;
    means for assigning, by the telematics service provider, a success factor to each of the at least two identified appropriate public safety answering points; and
    means for establishing, from the telematics service provider, communication between the traveling mobile unit and one of the at least two identified appropriate public safety answering points, the public safety answering point being chosen based on the success factors assigned to each of the at least two identified appropriate public safety answering points;
    wherein one of the at least two predicted positions of the traveling mobile unit is in a first public safety answering point boundary, wherein an other of the at least two predicted positions of the traveling mobile unit is in a second public safety answering point boundary, and wherein the means for assigning the success factor to each of the at least two identified appropriate public safety answering points includes:
    means for approximating a time it will take the traveling mobile unit to leave the first public safety answering point boundary and enter the second public safety answering point boundary;
    means for approximating a time it will take for establishing the communication between the traveling mobile unit and the one of the at least two identified appropriate public safety answering points; and
    means for determining, from the approximations, which of the public safety answering point boundaries the traveling mobile unit will be in during the establishing of the communication.

* * * * *